(No Model.)  H. L. ARNOLD.  2 Sheets—Sheet 1.
MEANS FOR CONVERTING MOTION.
No. 377,133.  Patented Jan. 31, 1888.
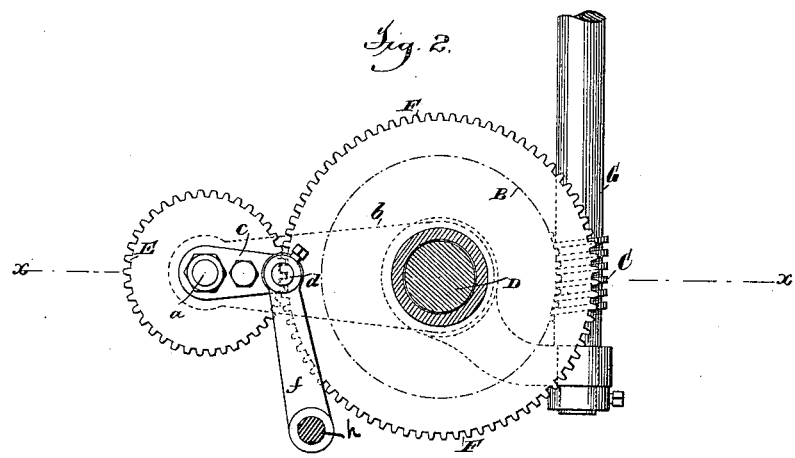
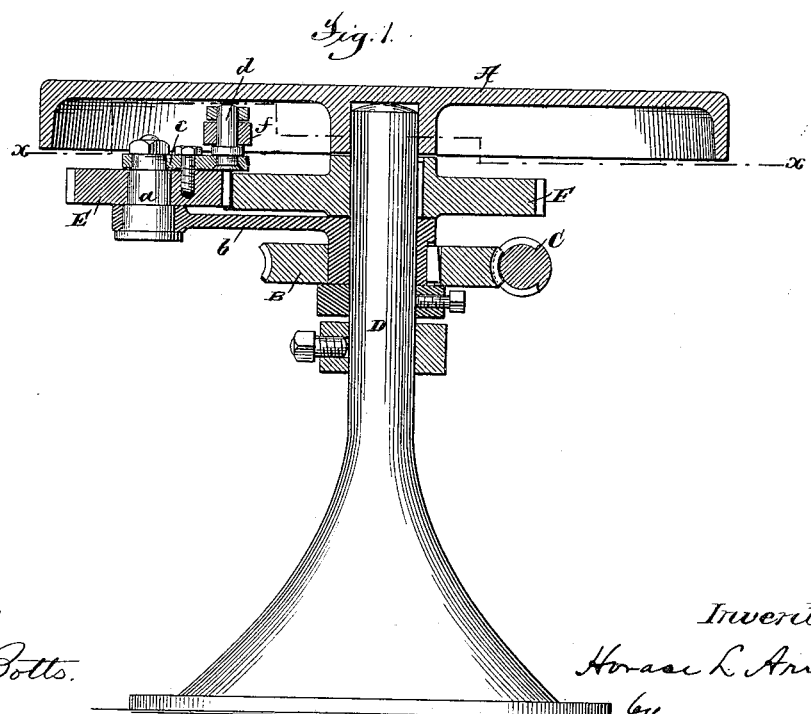
Attest:
Geo. H. Botts.
G. M. Borst.
Inventor:
Horace L. Arnold
by
Philipp, Phelps & Hovey
Attys

UNITED STATES PATENT OFFICE.

HORACE L. ARNOLD, OF BROOKLYN, ASSIGNOR OF ONE-HALF TO ROBERT W. SMITH, OF NEW YORK, N. Y.

MEANS FOR CONVERTING MOTION.

SPECIFICATION forming part of Letters Patent No. 377,133, dated January 31, 1888.

Application filed May 11, 1887. Serial No. 237,854. (No model.)

*To all whom it may concern:*

Be it known that I, HORACE L. ARNOLD, a citizen of the United States, residing at Brooklyn, county of Kings, and State of New York, have invented certain new and useful Improvements in Means for Converting Motion, fully described and represented in the following specification and the accompanying drawings, forming a part of the same.

This invention relates to a mechanical movement for converting a uniform rotary motion into an irregular rotary motion. This conversion of motion is frequently required in the arts, and the devices for accomplishing this result, which constitute the present invention, are therefore of general application. One useful application of these devices is in the rotation of a book-binder's table of the form and construction shown in the application for Letters Patent filed by R. W. Smith, of even date herewith, and this application of the invention has been selected for the purpose of illustrating the invention herein.

As a full understanding of the invention can only be given by an illustration and a detailed description of the devices embodying it, such description will be given, reference being had to the accompanying drawings, in which—

Figure 1:
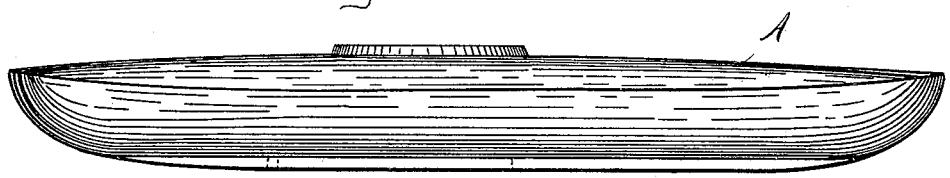
Figure 2:
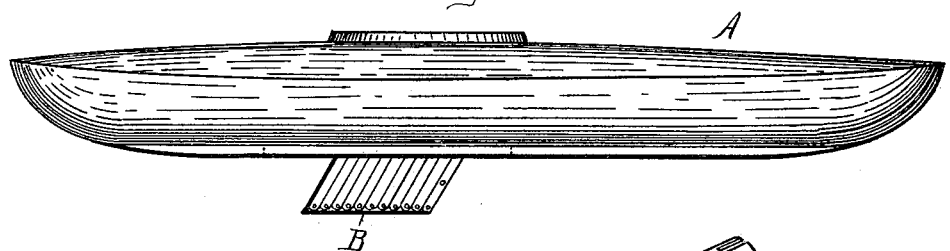
Figure 3:
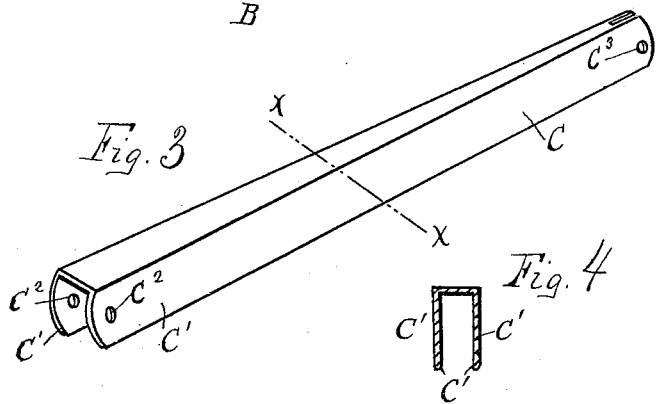
Figure 4:
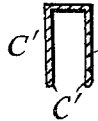

Figure 1 is a sectional elevation of the devices embodying the invention, the same being taken on the line $x\,x$ of Fig. 2. Fig. 2 is a horizontal section taken upon the line $x\,x$ of Fig. 1. Fig. 3 is a plan view of the devices, showing them in the same position seen in Figs. 1 and 2; and Fig. 4 is a similar view showing them in a different position.

Referring to said figures, let it be assumed that A is a table such as shown in the application referred to, to which it is desired to impart an irregular rotary motion, and that B is a part having a continuous regular rotary motion, from which the table A is to be driven.

In the case illustrated the part B is represented as a worm-gear, which is driven by a worm, C, upon a shaft, G, which in turn receives motion from any suitable source of power. The worm-gear B is mounted to turn freely upon the shaft or standard D, which standard also serves to support the table A, and is provided with an arm, $b$, the end of which is provided with a stud, $a$, upon which is mounted a small gear, E. The gear E is mounted to turn freely upon the stud $a$ and engages with a large gear, F, which is rigidly mounted on the standard D. The gear E is provided upon its upper face with an arm, $c$, which projects slightly beyond the edge of the gear, and is provided with a stud, $d$, which is connected by a link, $f$, with a stud, $h$, projecting from the under side of the table A.

The operation of the mechanism thus organized is as follows: The shaft G being set in motion, a continuous rotary movement will be imparted to the worm-gear B and its arm $b$. This will cause the gear E to have a planetary motion around the gear F—that is to say, it will be revolved bodily around the gear F—and it will at the same time, by reason of its engagement with the gear F, have a rotary motion about the stud $a$. The character of this planetary motion will of course be governed by the relative sizes of the gears E F. In the case shown the gear E is one-half the diameter of the gear F, and consequently will make two revolutions around the stud $a$ to each revolution around the gear F. The number of revolutions which the gear E will make around the stud $a$ during each revolution around the gear F can of course be varied and controlled by varying the relative sizes of the gears.

If it is desired in any case that the gear E should make three revolutions around the stud $a$ to each revolution around the gear F, then the gear E will be made one-third the diameter of the gear F, and so on. As the gear E is moved bodily around the gear F, the arm $c$ and stud $a$ will of course travel with it, and will therefore, by reason of their connection to the table A through the link $f$, give a rotary movement to the table A, so that it will make turn for turn with the gear B and arm $b$. As this takes place, however, the arm $c$ will, by reason of the rotation of the gear E about the stud $a$, receive an independent motion, and this motion will during a part of each revolution of the gear E be in conjunction with the movement of the gear E and arm $b$ around the gear F, and will therefore give an accelerated movement to the table A; and during a part of each revolution the movement of the arm $c$ and stud $d$ will be in opposition to the movement of the gear E and arm $b$, and will therefore tend to retard the movement of the table A.

From this it will be seen that while the table (No Model.) 2 Sheets—Sheet 1.

A. BARNUM.
FOLDING CENTER BOARD.

No. 377,134. Patented Jan. 31, 1888.

WITNESSES
Geo. A. Darby
John T. Booth

INVENTOR
Ashbell Barnum
by Geo. Aursher
atty.